J. A. ELSTON.
Stump-Sawing Machines.
No. 154,855. Patented Sept. 8, 1874.
Fig: 1.
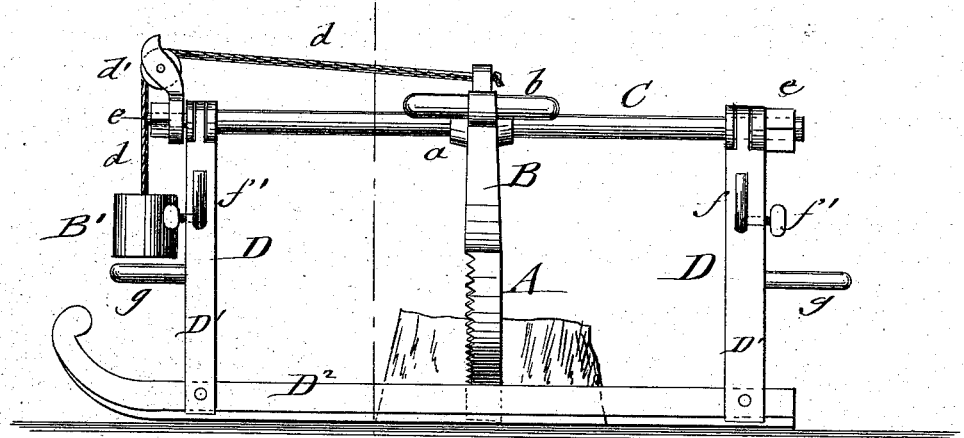
Fig: 2.
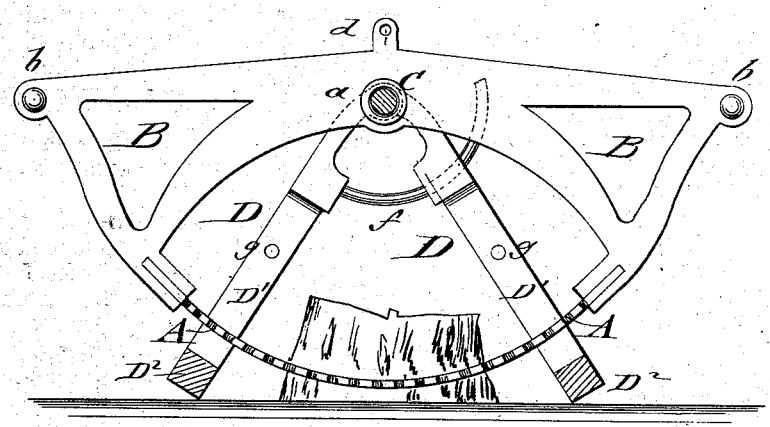
WITNESSES:
Chas. Nida
O. Sedgwick
INVENTOR:
J. A. Elston
BY Munn & Co
ATTORNEYS.

UNITED STATES PATENT OFFICE.

JAMES A. ELSTON, OF ELSTON STATION, MISSOURI.

IMPROVEMENT IN STUMP-SAWING MACHINES.

Specification forming part of Letters Patent No. 154,855, dated September 8, 1874; application filed August 1, 1874.

*To all whom it may concern:*

Be it known that I, JAMES A. ELSTON, of Elston Station, in the county of Cole and State of Missouri, have invented a new and Improved Stump-Sawing Machine, of which the following is a specification:

In the accompanying drawing, Figure 1 represents a side elevation of my improved stump-sawing machine, and Fig. 2 a vertical transverse section of the same on the line $c\ c$ of Fig. 1.

Similar letters of reference indicate corresponding parts.

The object of my invention is to provide, for the purpose of cutting off tree-stumps, an improved sawing-machine, which cuts them near the ground in concave shape, so as to retain the moisture and accelerate the rotting of the same.

My invention consists of a strong saw, applied in arc shape to a swinging frame, moving forward, by a cord and weight attached thereto, on a smooth shaft of an adjustable supporting-frame, secured, for cutting the stump, near the ground.

In the drawing, A represents a strong saw of the usual kind, which is sprung in arc shape and clamped to the ends of a swinging frame, B, which is applied, by a central sleeve or nut, $a$, to the smooth longitudinal top shaft C of main supporting-frame D. The saw-frame B is constructed of symmetrical parts at both sides of its central sleeve, as shown in Fig. 2, and provided with handles $b$ at the ends, for being operated by one or two men. A cord, $d$, is applied above the central part, and carried over a pulley, $d'$, being provided at the end with a suitable weight, B', for producing thereby the forward feeding of the saw into the stump. The main supporting-frame D consists of inclined legs D', which are pivoted to the ends of shaft C, and secured thereon by screw-nuts $e$. The higher or lower position of the shaft C above the ground, and the raising or lowering of the saw for cutting the stump higher or nearer to the ground, is produced by spreading the legs, and fastening them in the required position by arc-shaped guides $f$ and set-screws $f'$. The lower ends of the legs D¹ are connected longitudinally by base-runners D², for giving increased stability to the main frame D, and admitting a steadier seating on the ground. Suitable handles $g$ of the legs D¹ serve to carry the sawing-machine readily from stump to stump.

When the saw-frame is set to the stump, the swinging motion of the saw, together with the action of the weight, produces the entering, cutting, and advancing of the saw until the stump is cut off at the required point above the ground.

The hollow or concave surface of the stump near the ground retains the moisture, and produces thereby conditions more favorable to the rapid rotting of the stump than if left standing in the usual manner, while the operation is accomplished, moreover, in a very easy and convenient manner.

Having thus described my invention, I claim as new and desire to secure by Letters Patent—

1. The combination, in a portable machine for sawing stumps, of the arc-shaped saw A, rocking and self-feeding frame B, and stationary shaft C, as and for the purpose set forth.

2. The combination of jointed legs D¹, base-runners D², arc-shaped guides $f$, and set-screws $f'$, with the rocking and advancing saw, as and for the purpose described.

3. The combination of the main supporting-frame D with the arc-shaped guides $f$, set-screws $f'$, shaft C, saw-frame B, the arc-shaped saw A, central sleeve $a$, weight B', cord $d$, and pulley $d'$, all constructed and operating as herein shown and described, and for the purpose specified.

JAMES ANTHONY ELSTON.

Witnesses:
 THOS. L. HARPER,
 GEO. W. CHAMBERS.